Patented Jan. 19, 1926.

1,570,115

UNITED STATES PATENT OFFICE.

WILLIAM H. WOOD, OF SOUTH EUCLID, OHIO.

STORAGE BATTERY.

No Drawing.    Application filed August 7, 1922.   Serial No. 580,319.

*To all whom it may concern:*

Be it known that I, WILLIAM H. WOOD, a citizen of the United States, residing at South Euclid, in the county of Cuyahoga and State of Ohio, have invented a certain new and useful Improvement in Storage Batteries, of which the following is a full, clear, and exact description.

This invention relates to storage batteries and has for its object the provision of a battery wherein the plates may be fully formed and charged and assembled in a suitable jar in dry condition so as to be shipped and stored in what is known as the "bone-dry" condition, ready to become an active battery instantly upon the addition of a quantity of electrolyte. It is well known that a live and fully active storage battery is a sensitive piece of apparatus requiring constant attention and charging, wherefore these devices are extremely awkward to store or ship. It has long been the dream of manufacturers to be able to produce such a battery complete in all its parts with the exception of the electrolyte, the plates being fully formed and assembled in the jars with their interspersed separators so that immediately upon the introduction of a quantity of sulphuric acid solution the battery will become instantly active, while prior to the introduction of such electrolyte it is totally inert and free from tendency to deteriorate. It is necessary, however, in order to produce and charge these plates that they be electrolyzed in a sulphuric acid solution, as a result of which the positive plates become changed largely into lead peroxide and the negative plates largely or completely into spongy metallic lead. Experience proves that it is substantially impossible to remove all the acid from these porous plates. Even after careful washing and drying the positive plates will tend to sweat and the negative plates to become permanently sulphated. The sweating of the positive plates is not serious except as it tends to disintegrate the same and the separator, but the sulphating of the negative plate is fatal to the battery.

I have discovered that by impregnating this plate with a suitable crystalline substance it is possible to prevent this injurious action upon the spongy lead, and that if this crystalline substance be properly chosen, it can be dissolved by the electrolyte with which the cell is afterwards filled without injuring the performance or life of the battery. The substance used must be one which is not deposited electrolytically; it must be one which will not react with any of the constituents of the battery; it must be readily soluble in water, and should crystallize with a considerable proporton of water. The best substance which I have found for this purpose is magnesium sulphate, commonly known as Epsom salts although other compounds may exist or be discovered having some of the more essential requirements and I do not disclaim their use, even though additional treatment may become necessary to neutralize certain objectionable properties thereof. For example, sodium sulphate has many of the necessary qualities and I do not exclude its use or that of certain other compounds.

In the performance of my said invention the battery plates are pasted according to any suitable or desired formula and are set up and charged in the usual way. They are then removed from the electrolyte, rinsed, and then soaked in a solution of sulphate of magnesia, the same being preferably in a hot concentrated form: this treatment has two results, first that the osmosis effect of the solution causes it to penetrate into the plates and dislodge the sulphuric acid far more rapidly and completely than water alone, and, second, that upon the withdrawal and cooling of the plates, the sensible moisture is so far absorbed in the crystallization that, coupled with the evaporation from the hot plate the latter is dry by the time it becomes cool. There appear also to be certain other modes in which this substance assists in shielding the plate against injurious sulphation, namely: by sealing the pores more or less tightly it obstructs the access of atmospheric air which seems to be peculiarly harmful in conjunction with sulphuric acid; by obstructing the pores it delays the evaporation of any remaining acid to a concentration which would enable it to attack the plate; by reason of its water of crystallization it prevents such dessication of the plate as to enable the sulphuric acid to attack the same; by combining in some way with the remaining traces of acid to decrease its acitivity, since it is known that magnesium does produce some peroxidized salts. I do not restrict myself to any theories, since theories are difficult to prove and easy to change, but plant myself upon the facts; and I do not restrict myself to magnesium sulphate since most of the actions so far described are equally true of sodium sulphate and certain other salts of the most electro-positive elements. The battery is then reassembled together with its separators which also are preferably impregnated in a similar manner as described and claimed in my Patent issued April 10, 1923, No. 1,451,003, after which it may be kept indefinitely without deterioration, and at any time instantly becomes an active charged battery upon pouring into it a quantity of sulphuric acid solution, inasmuch as the magnesium sulphate or similarly indecomposable sulphate becomes dissolved therein without injuring the electrolyte or impeding the porosity of the plates. In some cases, as when the shipment and storage is to be for a comparatively short interval, it is sufficient merely to pour out the electrolyte, rinse the interior of the cell as thoroughly as may be, allow to drain for a few minutes then fill with a hot concentrated Epsom salt solution for a few minutes and finally drain away all that will escape, thereby impregnating in a single operation both the plates and the separators and this without taking the battery apart. In this case it is more important to have the solution hot in order to enable the battery interior to become dry by crystallization instead of by evaporation, but in a case where the plates are dismounted it is possible to use a cold solution although it requires a larger amount of time to effect crystallization.

From a chemical standpoint I have found neither advantage nor disadvantage in treating the positive plates in this manner, but from the practical standpoint I find a marked advantage as regards rapidity of drying. It is desirable to have the interior of a "bone dry" battery really dry, which is very difficult to accomplish with a porous member which has once been saturated with sulphuric acid, since dryness can be obtained by evaporation only after the last traces of sulphuric acid have been removed. But if this plate after being only partially freed from acid be immersed in or surrounded by a hot concentrated solution of any one of these salts, and the excess of solution then removed, the crystallization of the salt remaining in the adherent solution added to the evaporation from the hot plate will dissipate all sensible moisture and render the plates dry by the time that they become cool.

Accordingly the process is advantageous both physically and chemically and upon all the members of the battery, either before or after assembling, and whether the battery be new or old. I have even found it advantageous in case an old battery is to be left dormant for a time, merely to charge it fully and then wash it out with a hot solution of magnesium or sodium sulphate. Upon restoring the battery to active service it may either be rinsed out with water or electrolyte poured in immediately. This treatment keeps the separators from carbonizing, checking, or splitting, the positive plates from sweating, or the negative plates from sulphating.

In some cases it is not necessary to complete the process to the extent of removing the solution but the same may be left in the cells until it is desired to restore the battery to active condition.

It will be understood that it is not necessary to leave the crystalline substance on and in the plates until the electrolyte is added but the same can be washed off at any time, either immediately after the original soaking or immediately before the introduction of the electrolyte or at any intermediate period. One great advantage of magnesium sulphate is it does not need to be washed off as it has no injurious effect upon the battery, while certain of the alkali sulphates require to be removed. It is only necessary to exclude the metals which are deposited galvanically like zinc, copper, iron and the like, and all acids which act upon the lead.

Having thus described my invention what I claim is:

1. A fully charged negative plate for a storage battery consisting of spongy metallic lead having magnesium sulphate in its pores.

2. A fully charged dry, negative plate for a storage battery consisting essentially of spongy metallic lead having its pores impregnated with crystalline Epsom salts.

3. A bone dry negative element for storage batteries consisting essentially of spongy metallic lead having its pores impregnated with crystals of a water soluble salt, which crystals contain water of crystallization, the acid radical of the salt being one which does not impair the operation of a storage battery and the base of the salt consisting of a metal which is at least as electro-positive as magnesium.

4. A bone dry storage battery comprising fully charged active plates which are impregnated with a crystalline, water soluble sulphate of a metal which is at least as electro-positive as magnesium.

5. A bone dry battery comprising fully charged active plates which are impregnated with crystalline magnesium sulphate.

6. As an article of manufacture and sale, a bone dry storage battery comprising a dry container adapted to receive electrolyte, alternate, fully formed positive and negative elements therein, and separators between adjacent elements, the negative plates consisting essentially of spongy metallic lead having their pores impregnated with a dry, water soluble, crystalline sulphate of a metal which is at least as electro-positive as magnesium, the whole adapted to become an active battery immediately upon the introduction of a charge of electrolyte.

7. The process of producing a bone dry storage battery of the lead type which can stand indefinitely without deterioration which contains the steps of forming and charging the plates electrolytically, decanting and rinsing away the adherent electrolyte, and filling the pores of the plates with a solution of Epsom salts.

8. The process of preparing a lead-type storage battery for shipment and storage which consists of removing the electrolyte and impregnating the pores of the various battery elements with crystalline Epsom salts.

9. The process of preparing a lead-type storage battery for shipment and storage which consists of removing the electrolyte and subjecting the elements of the battery to contact with a hot concentrated solution of a sulphate of a metal at least as electro positive as magnesium.

10. The process of rendering a lead-type storage battery temporarily dormant which contains the steps of replacing the electrolyte with a solution of the sulphate salt of a base which is at least as electro-positive as magnesium, which salt crystallizes from aqueous solution in company with water of crystallization.

11. As an article of manufacture and sale, a dry container adapted to receive electrolyte, alternate, fully charged positive and negative elements therein, the positive element consisting largely of lead peroxide and the negative element consisting largely of spongy metallic lead treated with a nonhygroscopic, air excluding substance which protects the negative plate from oxidation so long as it is dry and which is soluble in electrolyte but does not enter into chemical reaction with the elements of the battery, the whole adapted to become a charged battery immediately upon the introduction of a quantity of electrolyte.

12. As an article of manufacture and sale a bone-dry charged storage battery, comprising charged positive plates, charged negative plates, separators between said plates, and a container for said plates and separators, the negative plates being filled with a shielding substance which is inactive when dry and which is soluble in electrolyte without chemical effect upon the battery.

In testimony whereof, I hereunto affix my signature.

WILLIAM H. WOOD.